(12) United States Patent
Sarkar et al.

(10) Patent No.: US 9,830,797 B2
(45) Date of Patent: Nov. 28, 2017

(54) HIGH PRESSURE HOSE WITH POLYMERIC TUBE

(71) Applicants: EATON CORPORATION, Cleveland, OH (US); AGC CHEMICALS AMERICAS, INC., Exton, PA (US)

(72) Inventors: Soumayajit Sarkar, Farmington Hills, MI (US); Javed Mapkar, Farmington Hills, MI (US); Edward Hummelt, Greenfield, WI (US); Kenneth Phaneuf, Chelsea, MI (US); Robert Michael Lefere, Jackson, MI (US); Joseph David Proof, Glenmoore, PA (US)

(73) Assignees: EATON CORPORATION, Cleveland, OH (US); AGC CHEMICALS AMERICAS, INC., Exton, PA (US)

( * ) Notice: Subject to any disclaimer, the term of this patent is extended or adjusted under 35 U.S.C. 154(b) by 388 days.

(21) Appl. No.: 14/143,519

(22) Filed: Dec. 30, 2013

(65) Prior Publication Data

US 2014/0182734 A1    Jul. 3, 2014

Related U.S. Application Data

(60) Provisional application No. 61/746,840, filed on Dec. 28, 2012.

(51) Int. Cl.
| | | |
|---|---|---|
| *F16L 11/00* | (2006.01) | |
| *F16L 9/14* | (2006.01) | |
| *G08B 21/18* | (2006.01) | |
| *F16L 11/10* | (2006.01) | |
| *B66B 3/00* | (2006.01) | |
| *B29D 23/00* | (2006.01) | |
| *F16L 11/08* | (2006.01) | |
| *B29C 53/56* | (2006.01) | |

(52) U.S. Cl.
CPC ........... *G08B 21/18* (2013.01); *B29D 23/001* (2013.01); *B66B 3/002* (2013.01); *F16L 11/082* (2013.01); *F16L 11/086* (2013.01); *F16L 11/10* (2013.01); *B29C 53/562* (2013.01)

(58) Field of Classification Search
CPC ........... F16L 11/10; F16L 11/12; B29D 23/00
USPC .......................... 138/126, 141, 153
See application file for complete search history.

(56) References Cited

U.S. PATENT DOCUMENTS

| | | | | |
|---|---|---|---|---|
| 4,887,647 A | * | 12/1989 | Igarashi | F16L 11/125 138/125 |
| 5,647,400 A | * | 7/1997 | Jani | F16L 11/081 138/126 |
| 5,958,532 A | | 9/1999 | Krause et al. | |

(Continued)

FOREIGN PATENT DOCUMENTS

| | | |
|---|---|---|
| CN | 1282351 A | 1/2001 |
| CN | 1644353 A | 7/2005 |

(Continued)

*Primary Examiner* — Vishal Pancholi
(74) *Attorney, Agent, or Firm* — Benesch Friedlander Coplan & Aronoff LLP

(57) ABSTRACT

A high pressure hose that is resistant to microvoid formation includes an inner tube comprising a blend of crosslinked fluoroplastic material and fluoroelastomeric material, a first reinforcement layer constructed of para-aramid synthetic fibers, and an adhesive layer, and an outer cover.

28 Claims, 3 Drawing Sheets

(56) References Cited

U.S. PATENT DOCUMENTS

| | | | | |
|---|---|---|---|---|
| 6,024,133 | A * | 2/2000 | Kodama | F16L 11/08 138/126 |
| 6,089,277 | A * | 7/2000 | Kodama | F16L 11/08 138/124 |
| 6,106,914 | A * | 8/2000 | Kanbe | B32B 1/08 138/137 |
| 6,849,314 | B2 * | 2/2005 | Jing | B32B 27/08 138/124 |
| 7,568,505 | B2 * | 8/2009 | Sakazaki | B32B 1/08 138/126 |
| 2004/0187948 | A1 * | 9/2004 | Shifman | B32B 1/08 138/125 |
| 2005/0054777 | A1 * | 3/2005 | Lee | C08L 27/12 525/199 |
| 2006/0099368 | A1 * | 5/2006 | Park | B32B 1/08 428/36.91 |
| 2007/0227610 | A1 * | 10/2007 | Sakazaki | F16L 11/04 138/177 |
| 2013/0192676 | A1 | 8/2013 | Gaw et al. | |

FOREIGN PATENT DOCUMENTS

| | | |
|---|---|---|
| CN | 1692132 A | 11/2005 |
| JP | 63-284250 A | 11/1988 |

\* cited by examiner

HIGH PRESSURE HOSE WITH POLYMERIC TUBE

This application claims priority to U.S. Provisional Patent Application No. 61/746,840, filed on Dec. 28, 2012.

FIELD OF INVENTION

The present disclosure relates to a high pressure hose. More particularly, the present disclosure relates to a high pressure hose having a polymeric tube reinforced by a braided fiber.

BACKGROUND

High pressure hoses are known in the art and have found use in many applications for conveying fluids. In some applications, such as use on an aircraft or spacecraft, high pressure hoses are exposed to wide temperature variations that occur cyclically. In aircraft, temperatures are known to fluctuate between −65° F. and 275° F. (between −55° C. and 135° C.). Known high pressure hoses include a core tube having an inner conductive polytetrafluoroethylene (PTFE) liner and a backing layer of PTFE. The core tube may be over-braided with para-aramid yarn. Crazes or microvoids may form in such hoses after numerous cycles of temperature changes. Such crazes are undesirable as they may create a pathway for the slow migration or leakage of the high pressure fluid from the interior to the exterior of the hose.

SUMMARY OF THE INVENTION

One embodiment includes a high pressure hose and a method of making the same that is resistant to microvoid formation. The hose may include an inner tube made of a blend of fluoroplastic material and fluoroelastomeric material that are lightly crosslinked, a first reinforcement layer constructed of para-aramid synthetic fibers, a second reinforcement layer constructed of para-aramid synthetic fibers, an adhesive layer, and an outer cover. The inner tube may include from about 1% to about 40% of the fluoroelastomeric material, from about 50% to about 99% of the fluoroplastic material, and a crosslinking agent.

In another embodiment, the hose also includes an inner liner disposed within the inner tube and made of a blend of a fluoroplastic material and a fluoroelastomeric material that are lightly crosslinked. The inner liner may include from about 1% to about 40% of the fluoroelastomeric material, from about 55% to about 99% of the fluoroplastic material, and a crosslinking agent.

In either embodiment, the fluoroplastic material may be selected from ethylene tetrafluoroethylene, perfluoroalkoxy, fluorinated ethylene propylene, polychlorotrifluoroethylene, ethylene chlorotrifluoroethylene, and polyvinylidene fluoride and the fluroelastomeric material may include a copolymer of tetrafluoroethylene and propylene.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
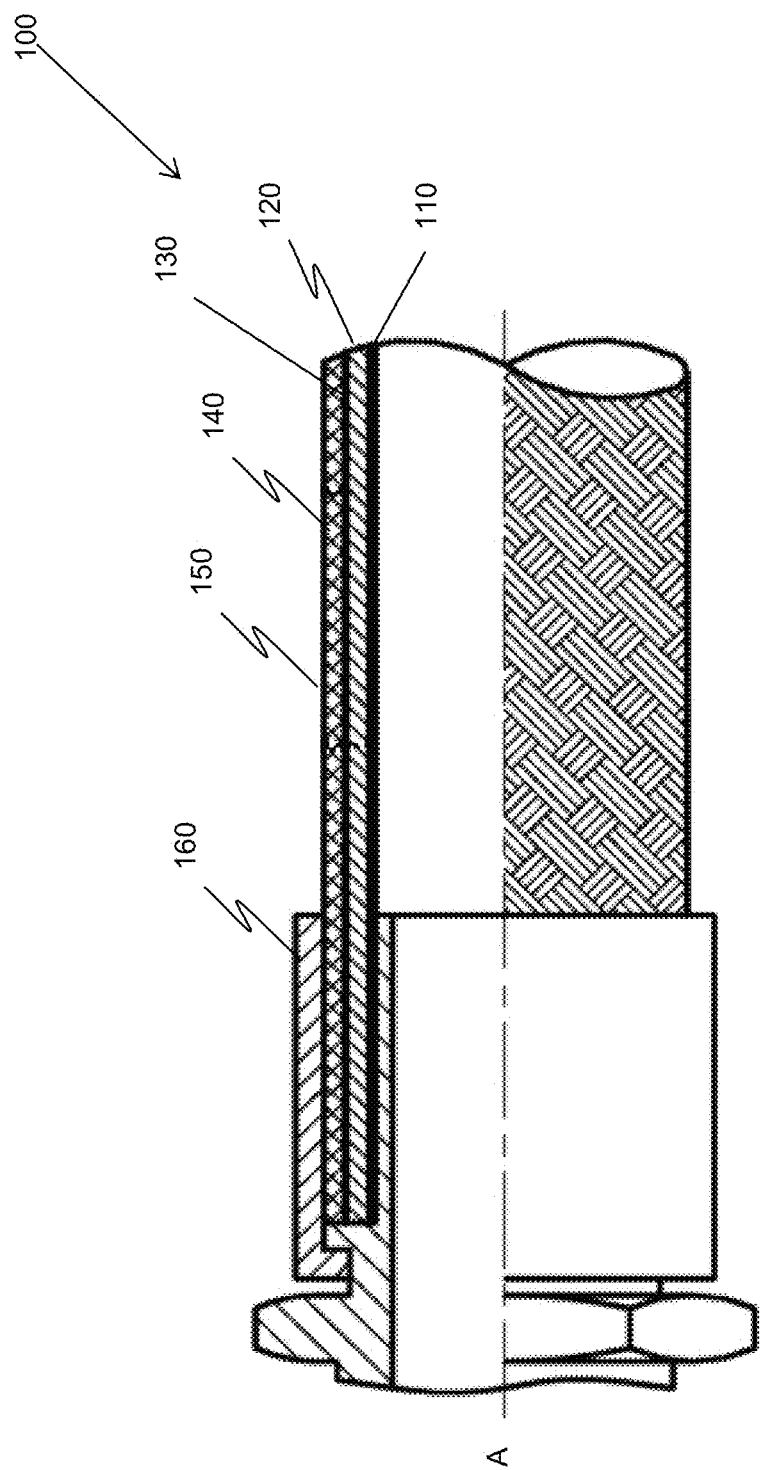
FIG. 1 is a side cutaway view of one embodiment of a hose.

Certain terminology will be used in the foregoing description for convenience in reference only and will not be limiting. For example, the terms "forward," "rearward," "right," "left," "upper," and "lower" designate directions in the drawings to which reference is made, with the terms "inward," "interior," or "inner" and "outward," "exterior," or "outer" referring, respectively, to directions toward and away from the center of the referenced element, and the terms "radial" and "axial" referring, respectively, to directions perpendicular and parallel to the central longitudinal axis of the referenced element.

Figure 2:
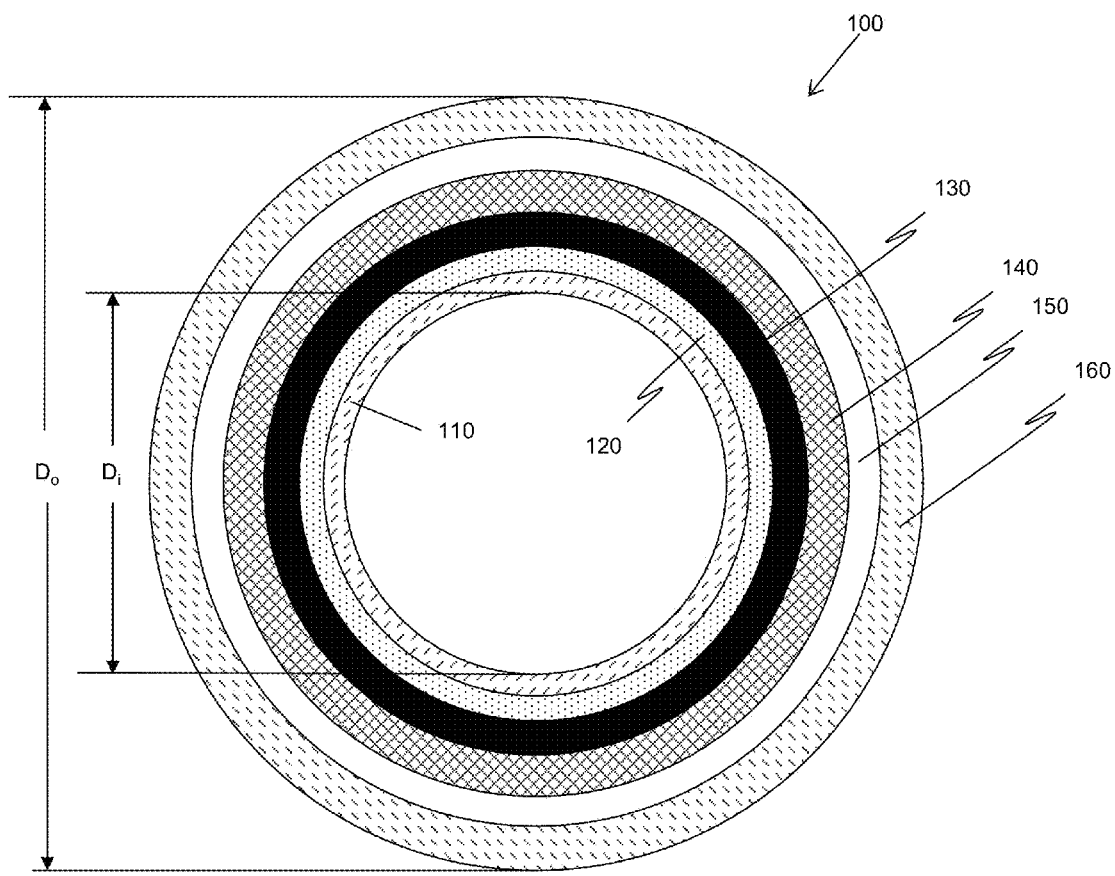
FIG. 2 is a schematic drawing, illustrating a cross section of one embodiment of a hose.

FIG. 1 is a side view, partly cut away, of one embodiment of a high pressure hose 100 for conveying fluid. It will be generally understood by those of skill in the art that a high pressure hose is one that is capable of prolonged use at or above 1000 psig. FIG. 2 is a schematic drawing, illustrating a cross section of the hose 100. The hose 100 will be discussed with reference to both FIGS. 1 and 2.

The hose 100 is a multi-layer structure that includes an inner liner 110, an inner tube 120, a first reinforcement layer 130, a second reinforcement layer 140, an adhesive layer 150, and an outer cover 160. Each of these layers will be discussed in more detail below.

In basic dimensions, the hose 100 extends axially to a predetermined length along a central longitudinal axis A, and has an inner diameter $D_i$ and outer diameter $D_o$. The dimensions of the inner diameter $D_i$ and the outer diameter $D_o$ can vary depending upon the particular fluid conveying application involved. In one known embodiment, the hose 100 conveys hydraulic fluid, such as SKYDROL.

In one embodiment, the inner liner 110 is constructed a blend of fluoroplastic and fluoroelastomeric materials. The blend includes about 1% to about 40% fluoroelastomeric material and a corresponding percentage (i.e., 60-99%) of fluoroplastic material and a crosslinking agent. In another embodiment, the blend may include about 40% fluoroelastomeric material and about 55% fluoroplastic material. The blend may include any melt processible fluoroplastic and fluoroelastomeric materials, such that the final product is a melt processible during primary extrusion, but then crosslinkable in a secondary process.

As one of ordinary skill in the art would understand, a fluoroelastomeric material is a special purpose fluorocarbon-based synthetic rubber. As one of ordinary skill in the art would further understand, a fluoroplastic is a fluorocarbon based polymer with multiple strong carbon-fluorine bonds. Examples of fluoroplastic materials include, without limitation, ethylene tetrafluoroethylene (ETFE), perfluoroalkoxy (PFA), fluorinated ethylene propylene (FEP), polychlorotrifluoroethylene (PCTFE), ethylene chlorotrifluoroethylene (ECTFE), and, Polyvinylidene fluoride (PVDF).

The inner liner 110 includes an inner surface, which defines the inner diameter $D_i$, and an outer surface, which defines a wall thickness therebetween. As with the overall dimensions of the hose 100, the wall thickness of the inner liner 110 may vary depending upon the particular fluid conveying application involved.

In one embodiment, the inner tube 120 is constructed of a blend of fluoroplastic and fluoroelastomeric materials. Accordingly, both the inner liner 110 and inner tube 120 may be constructed of a blend of fluoroplastic and fluoroelastomeric materials. Alternatively, one of the inner liner 110 and inner tube 120 may be constructed of thermoplastic elastomer (TPE), while the other is constructed of a blend of fluoroplastic and fluoroelastomeric materials. Because the inner tube 120 is adjacent the inner liner 110, it may also be referred to as a backing layer.

In an alternative embodiment (not shown), an intermediate layer may be provided between the inner liner 110 and the inner tube 120 if these two layers are formed of chemically dissimilar or otherwise incompatible materials. In another alternative embodiment (not shown), the inner liner 110 and inner tube 120 may be replaced with a tube having a unitary, single-layer construction.

In one embodiment, as the fluoroplastic and fluoroelastomeric materials are combined as described above, in either the inner tube or the inner liner, they are subjected to a crosslinking process in order to limit polymer chain mobility such that gross flow, as evidenced by creep or stress relaxation, and crazing are inhibited. The crosslinking process may be effectuated by adding any suitable chemical crosslinking agent, such as triallyl isocyanurate (TAIC), to the blend. After the inner liner or inner tube is formed in to a tube-like structure as described above, they may be further crosslinked by subjecting them to electron beam or gamma ray radiation.

In one embodiment, both the inner tube and the inner liner are lightly crosslinked. One of skill in the art would appreciate that light crosslinking includes a process that produces a blend of material that allows for greater molecular motion and ductility greater than what is typical of a material having a tight 3-D crosslinked network, such as would be produced within a thermoset polymer.

In one embodiment, the degree of crosslinking may be analyzed by quantifying the amount of swelling that occurs when the material is subjected to solvent. As the degree of crosslinking increases, the swell will go down because the materials are more tightly bound to one another. An acceptable amount of swell for the fluoropolymer blend when submerged in hydraulic fluid, such as Skydrol, is about 5% to about 30% by volume. In another example, an acceptable amount of swell would be about 7% to about 15% by volume.

In the illustrated embodiment, the first reinforcement layer 130 includes a braided reinforcement material. Alternatively, the first reinforcement layer 130 can include a spirally wound, knitted, or wrapped reinforcement material. The first reinforcement layer 130 is employed in the hose 100 to resist collapsing of the inner tube 120. Additionally, the first reinforcement layer 130 may fully cover the inner tube 120 (e.g., 100% coverage as shown in FIG. 1) or partially cover the inner tube 120 (e.g., 50% coverage).

The first reinforcement layer 130 is constructed of para-aramid synthetic fibers, such as KEVLAR. Para-aramid synthetic fibers provides the required strength to the hose and prevents the inner liner 110 and inner tube 120 from cracking. In one embodiment, the first reinforcement layer 130 is a 2×2 braid of three ends of para-aramid synthetic fibers.

The second reinforcement layer 140 also includes a braided reinforcement material. Alternatively, the second reinforcement layer 140 can include a spirally wound, knitted, or wrapped reinforcement material. The second reinforcement layer 140 is employed in the hose 100 to resist collapsing of the inner tube 120. Additionally, the second reinforcement layer 140 may fully cover the inner tube 120 (e.g., 100% coverage as shown in FIG. 1) or partially cover the inner tube 120 (e.g., 50% coverage).

The second reinforcement layer 140 is also constructed of para-aramid synthetic fibers, such as KEVLAR. In an alternative embodiment (not shown), only a single reinforcement layer is employed, and the second reinforcement layer is omitted.

In one embodiment, the adhesive layer 150 is double sided adhesive tape constructed of a PTFE, such as TEFLON. In alternative embodiments, the adhesive layer is a double sided polyester/mylar adhesive tape. In another alternative embodiment (not shown), the adhesive layer is omitted.

In the illustrated embodiment, the outer cover 160 includes a braided material such as polyester fiber. The braided polyester fiber outer cover 160 assists in keeping the cross-section of the inner tube 120 round as well as providing an aesthetically pleasing appearance. Also the polyester fiber protects the inner components from wear and abrasion. In an alternative embodiment (not shown), the outer cover can be knitted. In other embodiments, the outer cover can include natural or synthetic fibers. Moreover, the outer cover 160 may include a single ply or multiple plies of materials.

It may be desirable or required for a hose to meet specific performance requirement, depending on the application. In one known application, a hose is required to convey fluid at a pressure of 5,080 psi (35 MPa). For safety considerations, it is desirable for such a hose to have a minimum burst pressure of 20,320 psi (140 MPa) at room temperature and a minimum burst pressure of 15,240 psi (105 MPa) at 275° F. (135° C.). It is also desirable for such a hose to pass additional safety tests, including a pressure impulse test, a push/pull test, an assembly flex test, and a thermal variation test.

In a pressure impulse test, the hose goes through the following cycle: fluid pressure is increased from 0 to 7,620 psi (52.5 MPa), then decreased and held at 5,080 psi (35 MPa), and then decreased to 0. This cycle is repeated at a rate of 70 cycles per minute. It is desirable for a hose to pass through 300,000 cycles without failing.

In a push/pull test, the hose is maintained in a linear orientation. A first end of the hose is fixed, and the second end is alternately moved towards the first end, and away from the first end. This cycle is repeated at a rate of 20-60 cycles per minute. It is desirable for a hose to pass through 50,000 cycles without failing.

Figure 3:
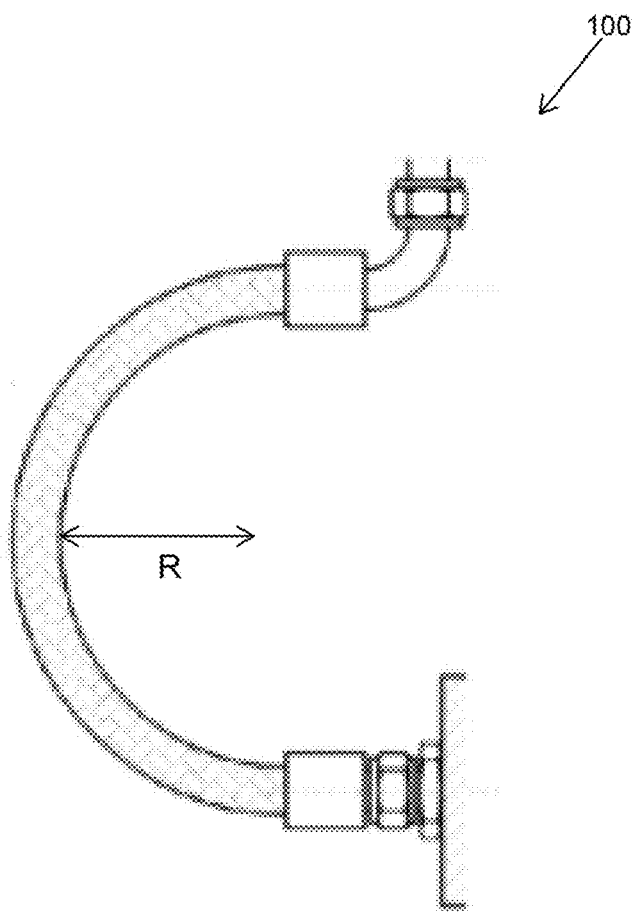
FIG. 3 is a side view of a hose bent at its minimum inside bend radius.

In an assembly flex test, the hose is bent to its minimum inside bend radius R, as shown in FIG. 3. A first end of the hose is fixed, while a second end is alternately moved in a straight line parallel to the axis of the opening of the second end. For example, in FIG. 3, the top end of the hose is fixed, and the bottom end is moved from left to right. This cycle is repeated at a rate of 60-80 cycles per minute. It is desirable for a hose to pass through 400,000 cycles without failing.

A thermal variation test may be used to detect microvoids or crazing in core tubes. In a thermal variation test, the hose is pressurized to 5080 psi, then brought to a temperature of 275° F. The hose is held at that temperature for four hours. Then the hose is cooled to −65° F. over the course of an hour. The hose is held at −65° F. for four hours. Then the hose is heated back up to 275° F. over the course of an hour. This completes 1 cycles. These cycles are repeated continuously until the tubes shows microvoids. The hose is continuously pressurized during the temperature cycling. The hose passes the test if it goes through 20 cycles without microvoids.

As one of ordinary skill in the art would understand, the selection of materials affects the performance of a hose. Additionally, where the hose includes one or more layers of braided fibers, the dimensions and twist of the fiber, as well as the braid angle and other braid architecture details will also affect the performance of a hose. Various examples of hoses have been tested, which have undergone the above-described tests with varying results.

In each of the examples below, the first reinforcement layer 130 and second reinforcement layer 140 are constructed of KEVLAR fibers. The KEVLAR fibers have a tensile strength of 3.6 GPa), a tensile modulus of 83 GPa, a density of 1.44 g/cm$^3$, and a tensile elongation of 4.0%.

EXAMPLE 1

Example 1

In a first example, the inner tube 110 was constructed of 40% AFLAS, a fluoroelastomeric material commercially available from ASAHI Glass, and 60% ETFE, a fluoroplastic material. The hose developed severe hydraulic leaks at the fittings due to stress relaxation of the inner tube material. In addition, the tube developed microvoids and was deemed unacceptable.

Example 2

In a second example, the inner tube 110 is constructed of 40% AFLAS 55% ETFE, and TRIC, a crosslinking agent. The blended material was then extruded into a tube and subjected to electron beam radiation at 10 mrad to effectuate further crosslinking of the two polymeric components.

The second example hose passed the thermal variation test described above, and did not develop microvoids to beyond 50 cycles. The second example hose also passed the push/pull test, and did not fail after 100,000 cycles.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Additionally, to the extent that the terms "on" or "onto" are used in the specification or the claims, it is intended to additionally mean "in," "into," or "near." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A high pressure hose comprising:
an inner tube comprising a blend of fluoroplastic material and fluoroelastomeric material, wherein the blend of fluoroplastic material and fluoroelastomeric material of the inner tube is crosslinked, and wherein the high pressure hose is resistant to microvoid formation during variations in temperature in the high pressure hose;
an inner liner disposed within the inner tube and comprising a blend of a fluoroplastic material and a fluoroelastomeric material;
a first reinforcement layer constructed of para-aramid synthetic fibers partially surrounding the inner tube;
an outer cover; and
an adhesive layer disposed between the first reinforcement layer and the outer cover.

2. The hose of claim 1, further comprising a second reinforcement layer constructed of para-aramid synthetic fibers.

3. The hose of claim 1, wherein the blend of fluoroplastic material and fluoroelastomeric material of the inner tube further comprises a chemical crosslinking agent.

4. The hose of claim 3, wherein the blend of fluoroplastic material and fluoroelastomeric material of the inner tube is lightly crosslinked.

5. The hose of claim 3, wherein the blend of fluoroplastic material, fluoroelastomeric material, and the crosslinking agent is subjected to a radiation crosslinking process selected from electron beam radiation or gamma ray radiation.

6. The hose of claim 1, wherein the inner tube comprises from about 1% to about 40% of the fluoroelastomeric material and from about 50% to about 99% of the fluoroplastic material.

7. The hose of claim 1, wherein the blend of a fluoroplastic material and a fluoroelastomeric material of the inner liner is crosslinked.

8. The hose of claim 7, wherein the blend of fluoroplastic material and fluoroelastomeric material of the inner liner further comprises a chemical crosslinking agent.

9. The hose of claim 8, wherein the inner liner comprises from about 1% to about 40% of the fluoroelastomeric material and from about 50% to about 99% of the fluoroplastic material.

10. The hose of claim 1, wherein the fluoroplastic material of the inner tube is selected from the group consisting of ethylene tetrafluoroethylene, perfluoroalkoxy, fluorinated ethylene propylene, polychlorotrifluoroethylene, ethylene chlorotrifluoroethylene, and polyvinylidene fluoride.

11. The hose of claim 10, wherein the fluoroplastic material of the inner tube is ethylene tetrafluoroethylene and the fluoroelastomeric material of the inner tube comprises a copolymer of tetrafluoroethylene and propylene.

12. A method of forming a multi-layer high pressure hose, the method comprising:
crosslinking a blend of fluoroplastic material and fluoroelastomeric material;
forming the blend of fluoroplastic material and fluoroelastomeric material in to an inner tube, wherein the multi-layer high pressure hose is resistant to microvoid formation during variations in temperature in the multi-layer high pressure hose;

forming a blend of a fluoroplastic material and a fluoroelastomeric material into an inner liner, wherein the inner liner is disposed within the inner tube;
providing a first reinforcement layer constructed of para-aramid synthetic fibers; and
providing an adhesive layer;
wherein the first reinforcement layer is disposed between an outer surface of the inner tube and the adhesive layer; and
wherein the adhesive layer is disposed between the first reinforcement layer and an outer cover.

13. The method of claim 12, further comprising the step of providing a second reinforcement layer constructed of para-aramid synthetic fibers that is disposed between the first reinforcement layer and the adhesive layer.

14. The method of claim 12, wherein the blend of fluoroplastic material and fluoroelastomeric material of the inner tube further comprises a chemical crosslinking agent.

15. The method of claim 12, wherein the blend of fluoroplastic material and fluoroelastomeric material of the inner tube is lightly crosslinked.

16. The method of claim 14, wherein the blend of fluoroplastic material, fluoroelastomeric material, and chemical crosslinking agent of the inner tube is subjected to a radiation crosslinking process selected from electron beam radiation or gamma ray radiation after it is formed in to the inner tube.

17. The method of claim 15, wherein the blend of the inner tube comprises from about 1% to about 40% of the fluoroelastomeric material and from about 50% to about 99% of the fluoroplastic material.

18. The method of claim 12 further comprising crosslinking the blend of fluoroplastic material and the fluoroelastomeric material of the inner liner.

19. The method of claim 18, wherein the inner liner blend comprises a chemical crosslinking agent.

20. The method of claim 12, wherein the inner liner blend comprises from about 1% to about 40% of the fluoroelastomeric material and from about 50% to about 99% of the fluoroplastic material.

21. The method of claim 12, wherein the fluoroplastic material of the inner tube is selected from the group consisting of ethylene tetrafluoroethylene, perfluoroalkoxy, fluorinated ethylene propylene, polychlorotrifluoroethylene, ethylene chlorotrifluoroethylene, and polyvinylidene fluoride.

22. The method of claim 20, wherein the fluoroplastic material of the inner tube is ethylene tetrafluoroethylene and the fluoroelastomeric material of the inner tube comprises a copolymer of tetrafluoroethylene and propylene.

23. The hose of claim 1, wherein a degree of crosslinking between the fluoroplastic material and fluoroelastomeric material of the inner tube is a function of a predetermined amount of swelling in the high pressure hose when subject to a solvent.

24. The hose of claim 23, wherein the predetermined amount of swelling in the high pressure hose when subject to the solvent is about 5% to about 30% by volume.

25. A high pressure hose comprising:
an inner tube comprising a blend of a fluoroplastic material and a fluoroelastomeric material, wherein the blend of the fluoroplastic material and the fluoroelastomeric material of the inner tube is crosslinked, wherein the high pressure hose is resistant to microvoid formation during variations in temperature in the high pressure;
an inner liner disposed within the inner tube, wherein the inner liner is an innermost tube of the high pressure hose and comprises a blend of a fluoroplastic material and a fluoroelastomeric material;
a first reinforcement layer constructed of para-aramid synthetic fibers partially surrounding the inner tube, wherein the inner tube is adjacent to the inner liner and the first reinforcement layer;
an outer cover; and
an adhesive layer disposed between the first reinforcement layer and the outer cover.

26. The hose of claim 1, wherein the inner tube is disposed between the inner liner and the first reinforcement layer.

27. The hose of claim 26, further comprising a second reinforcement layer constructed of the para-aramid synthetic fibers, wherein the second reinforcement layer is disposed between the first reinforcement layer and the adhesive layer.

28. The hose of claim 27,
wherein the inner tube is adjacent to the inner liner and the first reinforcement layer;
wherein the first reinforcement layer is adjacent to the second reinforcement layer;
wherein the second reinforcement layer is adjacent to the adhesive layer; and
wherein the adhesive layer is adjacent to the outer cover.

* * * * *